(12) United States Patent  (10) Patent No.: US 7,789,167 B2
Martin et al.  (45) Date of Patent: Sep. 7, 2010

(54) POWER ASSIST LEVER ARM ATTACHMENT

(75) Inventors: Scott A. Martin, Swansea, IL (US); Dustin D. Ribble, Piasa, IL (US); David N. Nappier, Caseyville, IL (US)

(73) Assignee: The Boeing Company, Chicago, IL (US)

( * ) Notice: Subject to any disclaimer, the term of this patent is extended or adjusted under 35 U.S.C. 154(b) by 230 days.

(21) Appl. No.: 12/103,869

(22) Filed: Apr. 16, 2008

(65) Prior Publication Data

US 2009/0261231 A1    Oct. 22, 2009

(51) Int. Cl.
*F16M 13/00* (2006.01)
(52) U.S. Cl. .............................. 173/31; 173/33; 173/37; 173/39; 173/40; 173/190
(58) Field of Classification Search .................. 173/31, 173/33, 37, 39, 40, 190; 248/674, 637
See application file for complete search history.

(56) References Cited

U.S. PATENT DOCUMENTS

| | | | | |
|---|---|---|---|---|
| 3,082,842 A * | 3/1963 | Balogh | .................... | 182/2.9 |
| 3,374,975 A * | 3/1968 | Bronder | .................... | 248/654 |
| 3,575,131 A * | 4/1971 | Lohmann | .................... | 118/699 |
| 3,590,930 A * | 7/1971 | Gronfors | .................... | 173/20 |
| 3,679,320 A * | 7/1972 | Bohorquez et al. | ............. | 408/99 |
| 3,721,304 A * | 3/1973 | Hanson | .................... | 173/2 |
| 3,744,575 A * | 7/1973 | Strommes | .................... | 173/31 |
| 3,750,763 A * | 8/1973 | Young et al. | .................... | 173/34 |
| 3,804,544 A * | 4/1974 | Adams | .................... | 408/14 |
| 3,967,687 A * | 7/1976 | Fowler | .................... | 173/32 |
| 3,980,142 A * | 9/1976 | Grigoriev et al. | ........... | 173/193 |
| 4,059,162 A * | 11/1977 | Zbinden et al. | .............. | 173/37 |
| 4,099,579 A * | 7/1978 | Stormon | .................... | 173/4 |
| 4,116,409 A * | 9/1978 | Barber et al. | ............... | 248/637 |
| 4,442,905 A * | 4/1984 | Agoston | .................... | 173/36 |
| 4,679,969 A | 7/1987 | Riley | | |
| 4,890,962 A | 1/1990 | Nydegger | | |
| 4,961,468 A * | 10/1990 | Crowell | .................... | 173/39 |
| 5,107,933 A * | 4/1992 | Wuhrer | .................... | 173/1 |
| 5,127,139 A * | 7/1992 | McCowin et al. | ........... | 29/26 A |
| 5,752,789 A * | 5/1998 | Stepan | .................... | 408/17 |
| 5,896,935 A * | 4/1999 | Esko et al. | .................... | 173/193 |
| 5,938,376 A * | 8/1999 | Alcaraz | .................... | 405/303 |
| 6,196,330 B1 * | 3/2001 | Matthias et al. | ............... | 173/48 |
| 6,196,772 B1 * | 3/2001 | Thames et al. | .............. | 408/1 R |
| 6,267,026 B1 * | 7/2001 | Yamamoto | .................... | 81/54 |
| 6,283,684 B1 * | 9/2001 | Jarvis | .................... | 408/103 |
| 6,752,221 B1 * | 6/2004 | Morissette | .................... | 173/38 |
| 6,776,562 B2 | 8/2004 | Morrison et al. | | |
| 7,220,084 B2 | 5/2007 | Otten | | |
| 2005/0189127 A1* | 9/2005 | Martin et al. | .................... | 173/1 |
| 2009/0016823 A1* | 1/2009 | Oberg | .................... | 405/259.3 |

* cited by examiner

*Primary Examiner*—Brian D Nash
(74) *Attorney, Agent, or Firm*—Tung & Associates

(57) ABSTRACT

A power assist lever arm attachment includes a drill, an L-shaped drilling head carried by the drill, an arm actuation cylinder carried by the drill, an arm piston extendable from the arm actuation cylinder, a lever arm pivotally carried by the arm piston and the drilling head and a bracket-engaging arm extending from the lever arm.

16 Claims, 5 Drawing Sheets

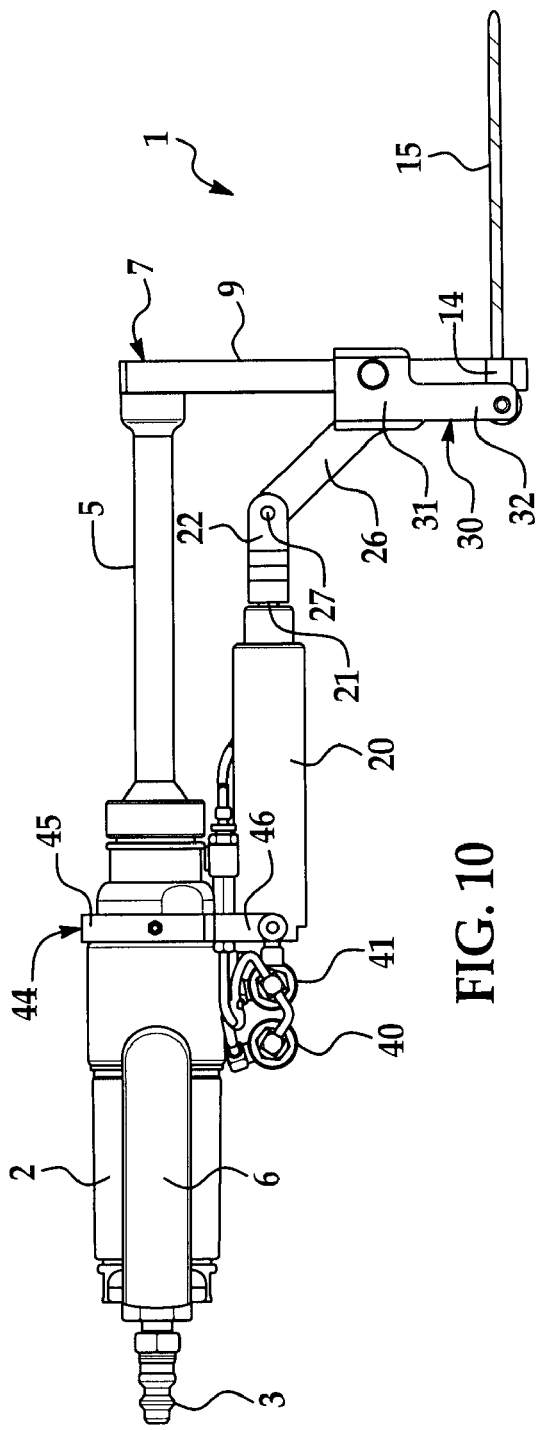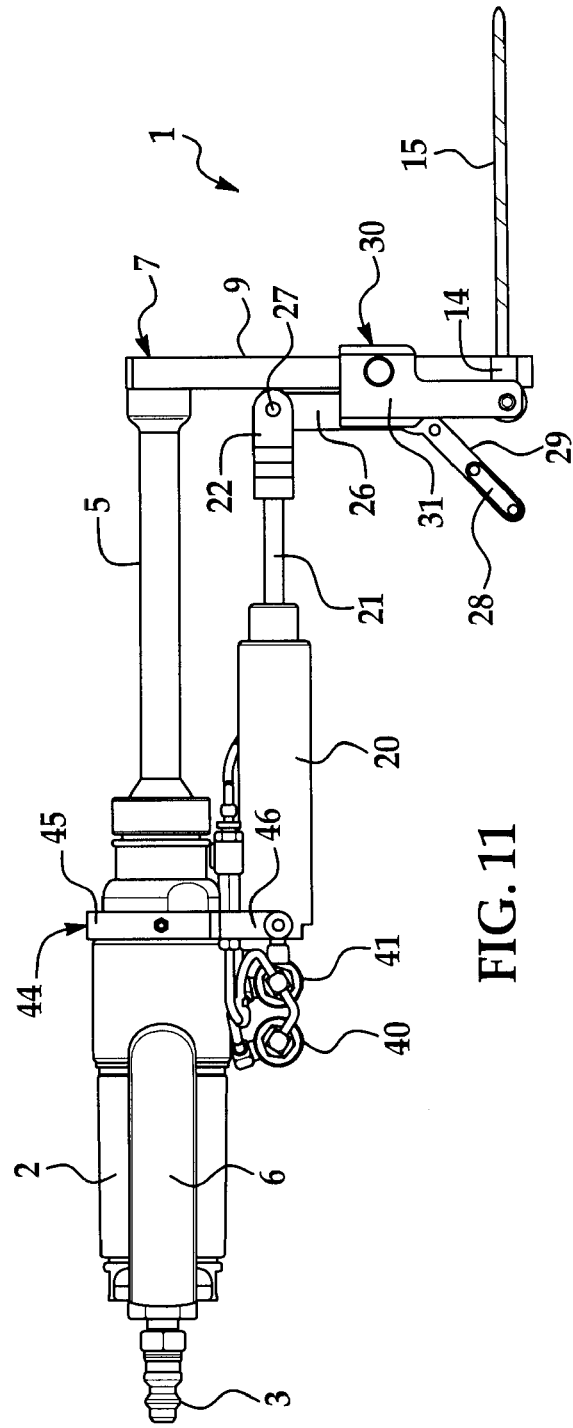

US 7,789,167 B2

POWER ASSIST LEVER ARM ATTACHMENT

TECHNICAL FIELD

The disclosure relates to apparatus used in limited access drilling. More particularly, the disclosure relates to a power assist lever arm attachment which applies drilling pressure through a lever arm to areas of limited access pockets where drilling is required.

BACKGROUND

In the drilling of openings in structures, such as in the fabrication of aircraft structures in the aerospace industry, for example, it may be necessary to drill openings in surfaces which are located inside tight spaces such as a limited access pocket. This operation may require a drill operator to apply pressure to a right angle drill motor with manual force at an awkward position either using the operator's bare hands and arms or using a pry tool such as a hammer handle or pry bar for leverage. This technique, however, may potentially injure the operator and may damage the aircraft structure by causing an oversized-opening condition which results from an uneven force applied with a pry tool at an angle which is not directly behind the center of the drilling operation.

SUMMARY

The disclosure is generally directed to a power assist lever arm attachment. An illustrative embodiment of the power assist lever arm attachment includes a drill, an L-shaped drilling head carried by the drill, an arm actuation cylinder carried by the drill, an arm piston extendable from the arm actuation cylinder, a lever arm pivotally carried by the arm piston and the drilling head and a bracket-engaging arm extending from the lever arm.

BRIEF DESCRIPTION OF THE DRAWINGS

FIG. 10 is a side view of a pneumatic drill fitted with an illustrative embodiment of the power assist lever arm attachment, more particularly illustrating the power assist lever arm attachment in a retracted position.

FIG. 11 is a side view of a pneumatic drill fitted with an illustrative embodiment of the power assist lever arm attachment, more particularly illustrating the power assist lever arm attachment in an extended position.

DETAILED DESCRIPTION

Figure 1:
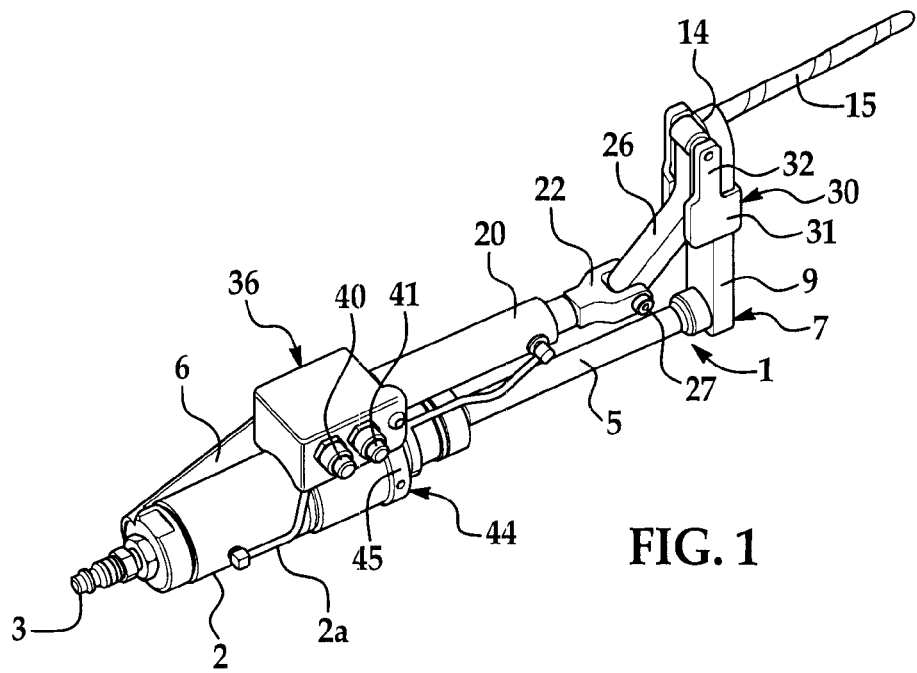
FIG. 1 is a perspective view of a pneumatic drill fitted with an illustrative embodiment of the power assist lever arm attachment.

Referring initially to FIGS. 1-11 of the drawings, an illustrative embodiment of the power assist lever arm attachment, hereinafter attachment, is generally indicated by reference numeral 1. The attachment 1 may be adapted for attachment to a drill 2 which may be pneumatic. The drill 2 may be fitted with an air inlet nipple 3 for attachment to a compressed air hose (not shown). The drill 2 may be fitted with a squeeze-actuated drill actuation handle 6 which facilitates operation of the drill 2.

Figure 2:
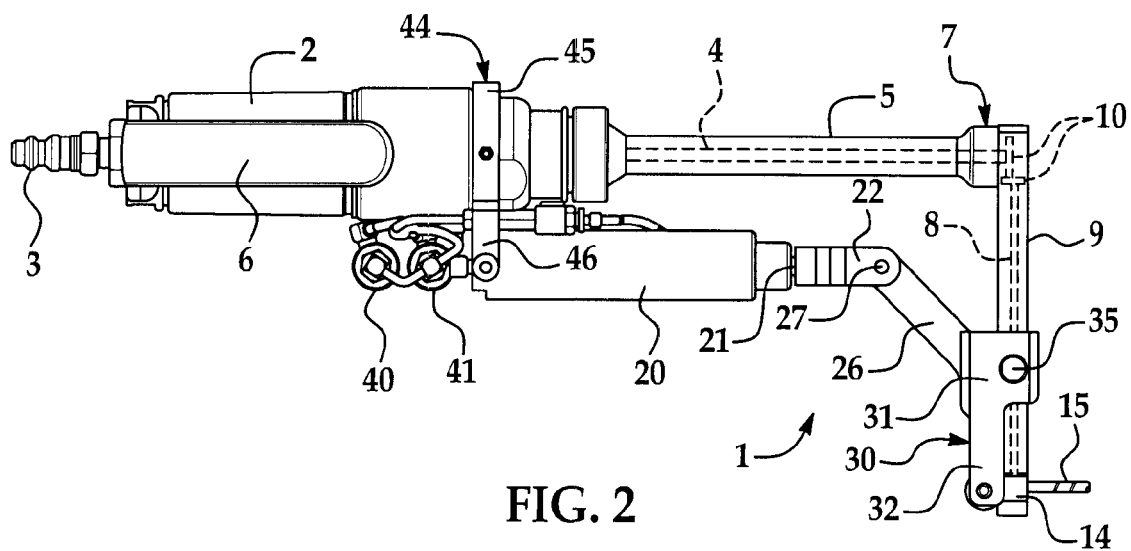
FIG. 2 is a side view of a pneumatic drill fitted with an illustrative embodiment of the power assist lever arm attachment.

As shown in FIG. 2, the drill 2 may drivingly engage a drive shaft 4 (shown in phantom). A generally L-shaped drilling head 7 may extend from the drill 2 and may include a drive shaft housing 5 which may extend from the drill 2 and enclose the drive shaft 4. A torque transfer shaft 8 may be drivingly engaged by the drive shaft 4 through transfer gears 10. A torque transfer housing 9 may extend from the drive shaft housing 5 and enclose the torque transfer shaft 8. The torque transfer housing 9 may be oriented in generally perpendicular relationship with respect to the drive shaft housing 5. A drill spindle 14 may be provided on the torque transfer housing 9. A drill bit 15 may be inserted in the drill spindle 14 and drivingly engaged by the torque transfer shaft 8 (FIG. 2) which extends through the torque transfer housing 9.

Figure 8:
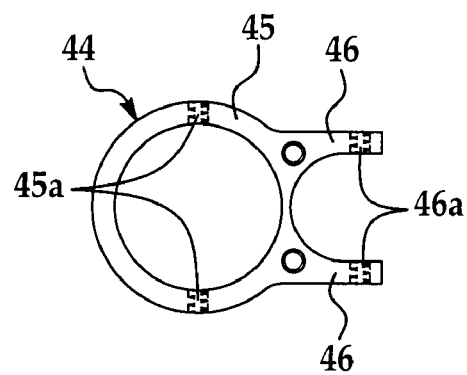
FIG. 8 is a top view of a cylinder attachment bracket which is suitable for attachment of an arm actuating cylinder of the power assist lever arm attachment to a pneumatic drill.

The attachment 1 may include a pneumatic arm actuation cylinder 20 which may be attached to the drill 2 using any suitable technique which is known to those skilled in the art. In some embodiments, a cylinder attachment bracket 44 may attach the arm actuation cylinder 20 to the drill 2. As shown in FIG. 8, the cylinder attachment bracket 44 may include an annular bracket collar 45. A pair of spaced-apart bracket flanges 46 may extend from the bracket collar 45. As shown in FIG. 2, the bracket collar 45 of the cylinder attachment bracket 44 may be adapted to receive the drill 2. A pair of threaded fastener openings 45a (FIG. 8) may extend through the bracket collar 45 to receive respective fasteners (not shown) which attach the bracket collar 45 to the drill 2. As further shown in FIG. 2, the spaced-apart bracket flanges 46 (one of which is shown) may be adapted to receive the arm actuation cylinder 20. A pair of threaded fastener openings 46a (FIG. 8) may extend through the respective bracket flanges 46 to receive respective fasteners (not shown) which attach the bracket flanges 46 to the arm actuation cylinder 20.

Figure 3:
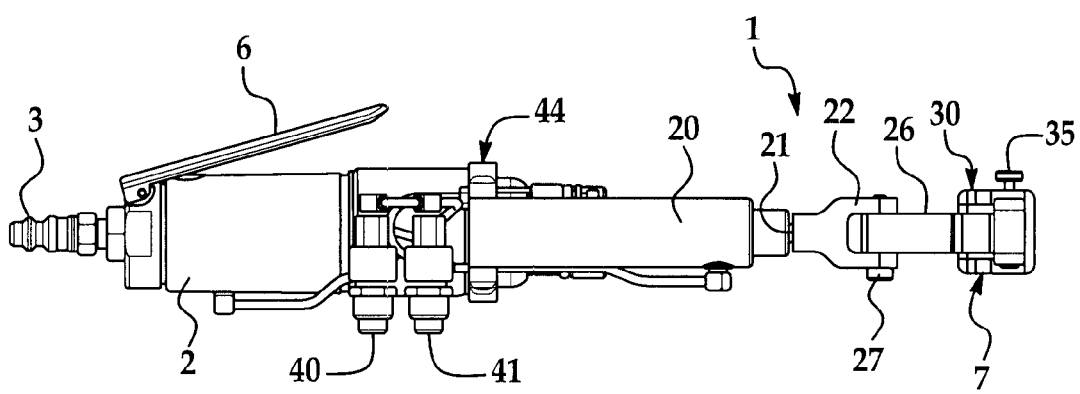
FIG. 3 is a top view of a pneumatic drill fitted with an illustrative embodiment of the power assist lever arm attachment.

An arm piston 21 (shown in the retracted position in FIGS. 1-3) is selectively extendable from and retractable into the arm actuation cylinder 20. An arm piston bracket 22, which may have a generally forked shape, as shown in FIG. 3, may be provided on the extending or distal end of the arm piston 21. A lever arm 26 may be pivotally attached to the arm piston bracket 22 via a pivot pin 27. The pivot pin 27 may be a "floating" type pivot pin which is mounted for displacement along a pin slot (not shown) provided in the lever arm bracket 30. A bracket-engaging arm 29 may extend from the lever arm 26 at an obtuse angle with respect to the lever arm 26.

Figures 2A, 2B:
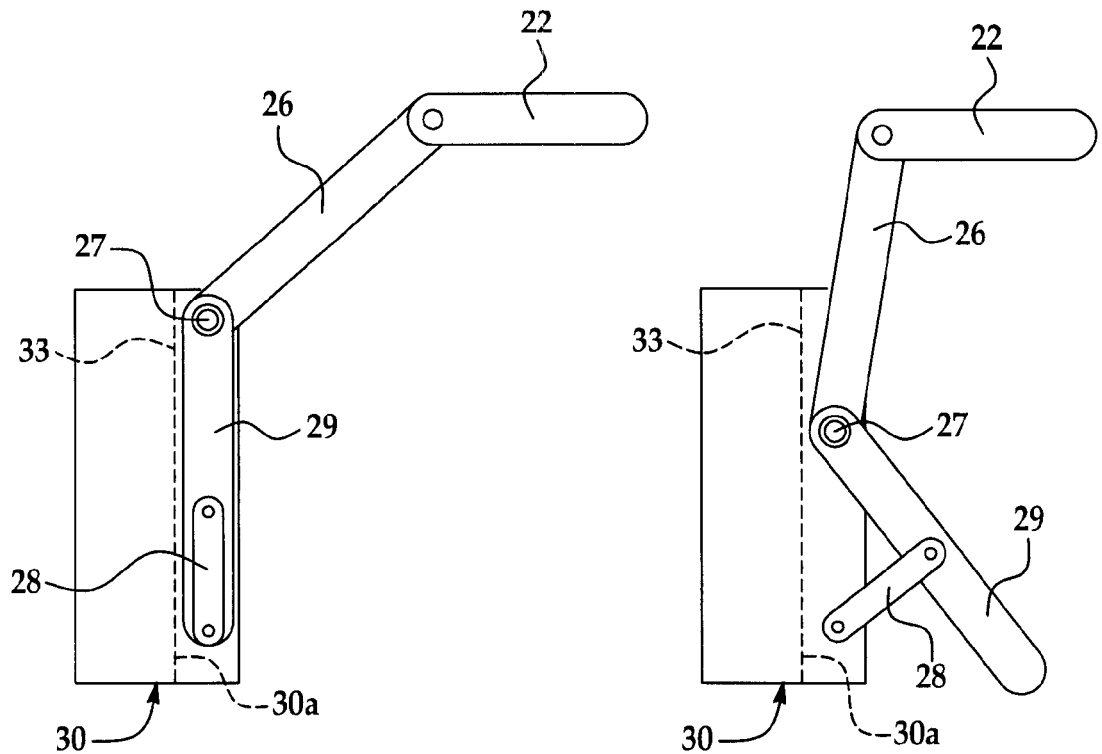
FIG. 2A is a schematic view of an illustrative linkage between an arm piston and a lever arm bracket of an illustrative embodiment of the power assist lever arm attachment, disposed in a functional, power-assist position.
FIG. 2B is a schematic view of an illustrative linkage between an arm piston and a lever arm bracket of an illustrative embodiment of the power assist lever arm attachment, disposed in a retracted position.
Figure 4:
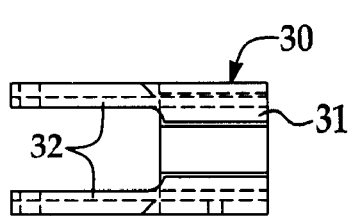
FIG. 4 is a top view of a lever arm bracket which is suitable for coupling a lever arm of the power assist lever arm attachment to a drilling head of a pneumatic drill.
Figure 5:
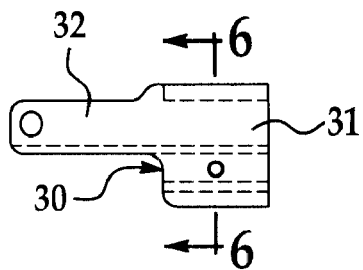
FIG. 5 is a side view of the lever arm bracket.
Figure 6:
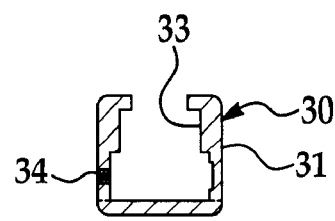
FIG. 6 is a cross-sectional view, taken along section lines 6-6 in FIG. 5, of the lever arm bracket.

A lever arm bracket 30 may be provided on the torque transfer housing 9 of the drill 2. As shown in FIGS. 4-6, the lever arm bracket 30 may include a bracket base 31. As shown in FIG. 6, a bracket channel 33 may extend through the bracket base 31. As shown in FIGS. 2A and 2B, an arm channel 30a may be provided in the lever arm bracket 30 opposite the bracket channel 33. An interiorly-threaded knob opening 34 may be provided in the bracket base 31 and communicate with the bracket channel 33. A pair of generally parallel, spaced-apart bracket arms 32 may extend from the bracket base 31. The bracket channel 33 may be adapted to receive the torque transfer housing 9. A bracket adjustment knob 35 (FIGS. 2 and 3) may be threaded into the knob opening 34 and selectively tightened against the torque transfer housing 9 to secure the lever arm bracket 30 at a selected location along the length of the torque transfer housing 9. The lever arm 26 may be pivotally attached to the bracket base 31 of the lever arm bracket 30. As shown in FIGS. 2A and 2B, a linkage arm 28 may connect the bracket-engaging arm 29 to the lever arm bracket 30.

Figure 9:
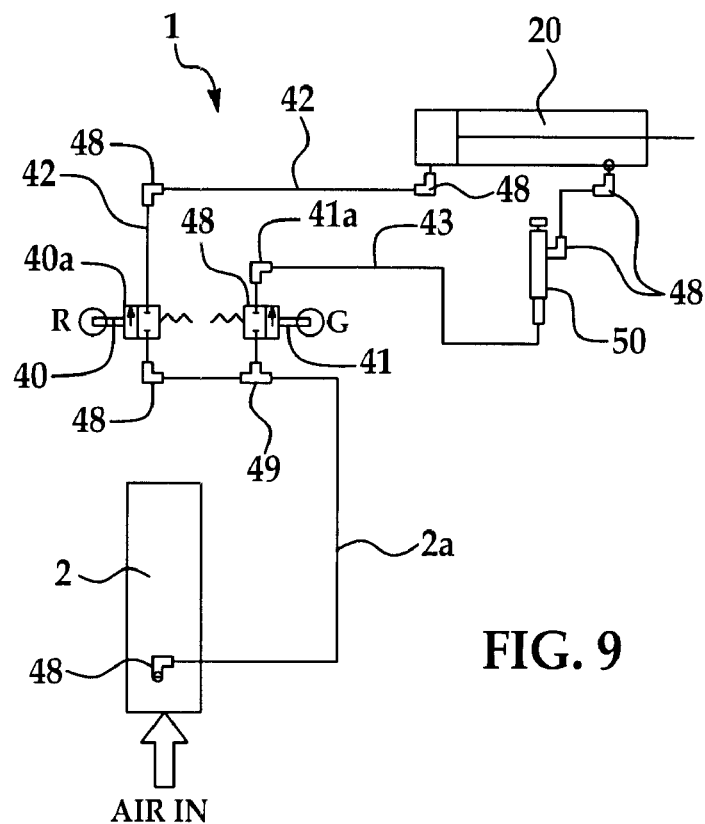
FIG. 9 is a schematic diagram illustrating pneumatic connection of an illustrative embodiment of the power assist lever arm attachment to a pneumatic drill.

As shown in FIG. 9, the arm actuation cylinder 20 of the attachment 1 is pneumatically coupled to the drill 2. A piston extension stem valve 40a, fitted with a piston extension button 40, and a piston retraction stem valve 41a, fitted with a piston retraction button 41, are disposed between the drill 2 and the arm actuation cylinder 20. In some embodiments, the piston extension button 40 and the piston retraction button 41 may be color-coded; for example, the piston extension button 40 may be green and the piston retraction button 41 may be red.

An air outlet line 2a connects the drill 2 to each of the piston extension stem valve 40a and the piston retraction stem valve 41a. A piston extension air line 42 connects the piston extension stem valve 40a to the arm actuation cylinder 20. A piston retraction air line 43 connects the piston retraction stem valve 41a to the arm actuation cylinder 20. A valve 50 may be pneumatically connected between the piston retraction air line 43 and the arm actuation cylinder 20. Angle fittings 48 and T-fittings 49 may pneumatically connect the various components of the attachment 1 to each other. Accordingly, by actuation of the piston extension button 40, pressurized air flows from the drill 2; through the air outlet line 2a, the piston extension stem valve 40a and the piston extension air line 42, respectively; and into the arm actuation cylinder 20, where the pressurized air extends the arm piston 21 from the arm actuation cylinder 20. Conversely, by actuation of the piston retraction button 41, air flows from the drill 2 through the air outlet line 2a, the piston retraction stem valve 41a, the piston retraction air line 43 and the valve 50, respectively; and into the arm actuation cylinder 20, where the pressurized air retracts the arm piston 21 into the arm actuation cylinder 20.

As shown in FIG. 11, when the arm piston 21 is extended from the arm actuation cylinder 20, the lever arm 26 is disposed in a generally parallel orientation with respect to the longitudinal axis of the torque transfer housing 9 and the bracket-engaging arm 29 disengages the lever arm bracket 30. As shown in FIG. 10, when the arm piston 21 is retracted into the arm actuation cylinder 20, the lever arm 26 assumes an angled position with respect to the longitudinal axis of the torque transfer housing 9 of the drill 2 as the lever arm 26 pivots with respect to the lever arm bracket 30. The bracket-engaging arm 29 engages and exerts pressure against the lever arm bracket 30. In turn, the lever arm bracket 30 exerts pressure against the drill bit 15.

Figure 7:
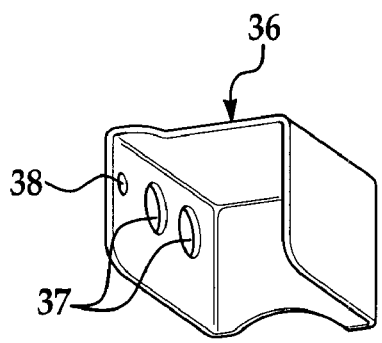
FIG. 7 is a perspective view of a control box which is suitable for an illustrative embodiment of the power assist lever arm attachment.

As shown in FIGS. 1-3, the piston extension button 40 and the piston retraction button 41 may be provided on a control box 36 which may be mounted on the drill 2 using brackets (not shown) and/or alternative attachment technique known to those skilled in the art. As shown in FIG. 7, the control box 36 may include a pair of button openings 37 which receive the piston extension button 40 and the piston retraction button 41, respectively. At least one wiring opening 38 may be provided in the control box 36 to facilitate the passage of wiring (not shown) to the piston extension button 40 and the piston retraction button 41.

In typical application, the attachment 1 is used to drill an opening (not shown) in a surface of an aircraft structure (not shown) in areas having limited access. For example, in some applications the attachment 1 may be used to drill a fastener opening in a surface which is inside a pocket of an aircraft structure. Accordingly, a compressed air hose (not shown) which is connected to a source (not shown) of compressed air may be attached to the air inlet nipple 3 of the drill 2. The drill 2 may be operated by manual actuation of the drill actuation handle 6, for example, to rotate the drill bit 15. In the non-functional configuration, the arm piston 21 may normally be disposed in the extended position from the arm actuation cylinder 20 as shown in FIG. 11.

The attachment 1 may be operated to increase the pressure of the drill bit 15 against the surface (not shown) in which the opening is being drilled. This may be carried out by selective retraction of the arm piston 21 into the arm actuation cylinder 20 (by actuation of the piston extension button 40) which results in sliding of the lever arm 26 in the arm channel 30a and travel of the pivot pin 27 along the pin slot (not shown) through which it extends as the lever arm 26 pivots with respect to the pivot pin 27, as shown in FIG. 2B. Simultaneously, the bracket engaging arm 29 is extended against the interior surface of the arm channel 30a in the lever arm bracket 30, as shown in FIGS. 10 and 2A. Therefore, the added force exerted by the bracket-engaging arm 29 against the lever arm bracket 30 results in additional pressure being placed against the drill bit 15, enhancing drilling of the drill bit 15 through the surface. The bracket-engaging arm 29 can be selectively disengaged from the lever arm bracket 30 by extension of the arm piston 21 from the arm actuation cylinder 20 via actuation of the piston retraction button 41. This action pivots the lever arm 26 from the position shown in FIGS. 10 and 2A to the position shown in FIGS. 11 and 2B and removes the pressure which was exerted by the bracket-engaging arm 29 against the lever arm bracket 30.

It will be appreciated by those skilled in the art that the attachment 1 may exert drilling pressure or thrust directly along the centerline of the drill spindle 14 in order to form high-quality fastener openings (not shown) in the structure. Furthermore, the position of the lever arm bracket 30 along the torque transfer housing 9 may be adjusted, allowing the operator of the drill 2 to move the lever arm bracket 30 and lever arm 26 out of the way, place the drill bit 15 in the drill spindle 14 and then slide the lever arm bracket 30 back until the bracket-engaging arm 29 is positioned directly behind the drill spindle 14 for drilling. This feature enables the operator to realize the ergonomic, quality and cycle time benefits of power feed drilling in extremely limited access areas that previously required manual drilling.

Figure 12:
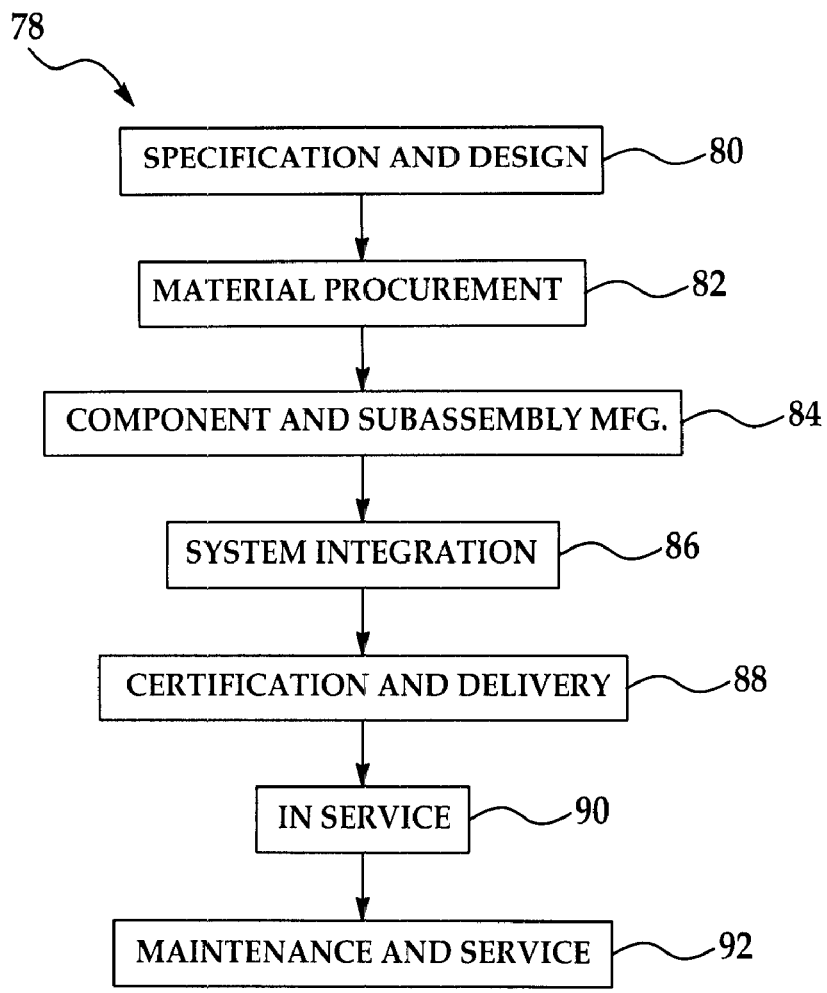
FIG. 12 is a flow diagram of an aircraft production and service methodology.
Figure 13:
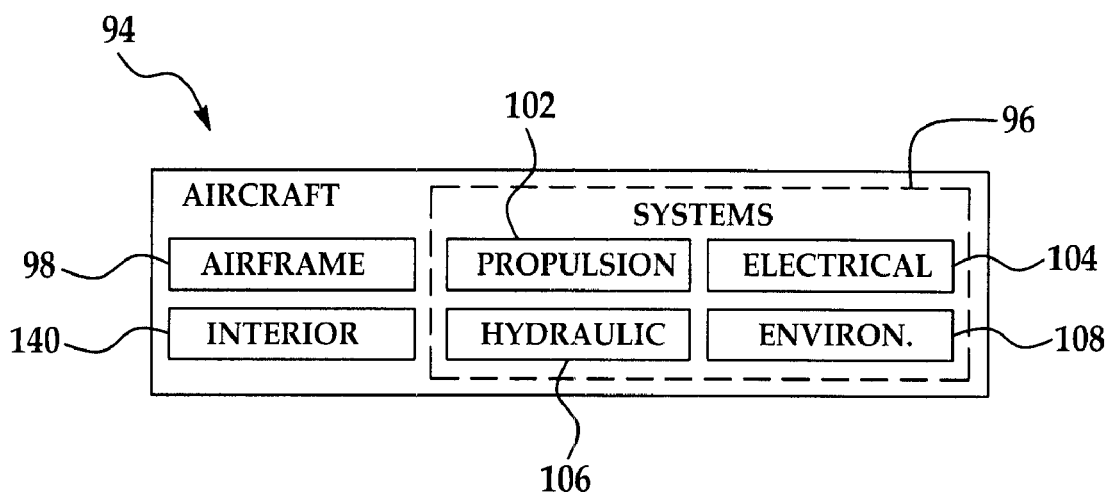
FIG. 13 is a block diagram of an aircraft.

Referring next to FIGS. 12 and 13, embodiments of the disclosure may be used in the context of an aircraft manufacturing and service method 78 as shown in FIG. 12 and an aircraft 94 as shown in FIG. 13. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A power assist lever arm attachment, comprising:
   a drill;
   an L-shaped drilling head carried by said drill;
   an arm actuation cylinder carried by said drill;
   an arm piston extendable from said arm actuation cylinder;
   a piston extension stem valve and piston retraction stem valve connected between said drill and said arm actuation cylinder and a piston extension button engaging said piston extension stem valve and a piston retraction button engaging said piston retraction stem valve;
   a lever arm pivotally carried by said arm piston and said drilling head; and
   a bracket-engaging arm extending from said lever arm.

2. The attachment of claim 1 further comprising a lever arm bracket carried by said drilling head and wherein said lever arm is pivotally attached to said lever arm bracket.

3. The attachment of claim 2 wherein said lever arm bracket is adjustably carried by said drilling head.

4. The attachment of claim 1 wherein said piston extension button and said piston retraction button are different colors.

5. The attachment of claim 1 further comprising a control box carried by said drill and wherein said piston extension button and said piston retraction button are carried by said control box.

6. The attachment of claim 1 further comprising a cylinder attachment bracket carried by said drill and wherein said arm actuation cylinder is carried by said cylinder attachment bracket.

7. The attachment of claim 6 wherein said cylinder attachment bracket comprises a bracket collar receiving said drill and a pair of spaced-apart bracket flanges extending from said bracket collar and receiving said arm actuation cylinder.

8. A power assist lever arm attachment, comprising:
   a drill;
   an L-shaped drilling head having a drive shaft housing extending from said drill and a torque transfer housing extending from and oriented in generally perpendicular relationship with respect to said drive shaft housing;
   an arm actuation cylinder carried by said drill;
   an arm piston extendable from said arm actuation cylinder;
   a lever arm pivotally carried by said arm piston and said torque transfer housing of said drilling head;
   a bracket-engaging arm extending from said lever arm at an obtuse angle with respect to said lever arm; and
   a cylinder attachment bracket carried by said drill and wherein said arm actuation cylinder is carried by said cylinder attachment bracket;
   wherein said cylinder attachment bracket comprises a bracket collar receiving said drill and air of spaced-apart bracket flanges extending from said bracket collar and receiving said arm actuation cylinder.

9. The attachment of claim 8 further comprising a lever arm bracket carried by said torque transfer housing of said drilling head and wherein said lever arm is pivotally attached to said lever arm bracket.

10. The attachment of claim 9 wherein said lever arm bracket is adjustably carried by said torque transfer housing of said drilling head.

11. The attachment of claim 8 further comprising a piston extension stem valve and a piston retraction stem valve connected between said drill and said arm actuation cylinder and a piston extension button engaging said piston extension stem valve and a piston retraction button engaging said piston retraction stem valve.

12. The attachment of claim 11 wherein said piston extension button and said piston retraction button are different colors.

13. The attachment of claim 11 further comprising a control box carried by said drill and wherein said piston extension button and said piston retraction button are carried by said control box.

14. A power assist lever arm attachment, comprising:
   a drill;
   an L-shaped drilling head having a drive shaft housing extending from said drill and a torque transfer housing extending from and oriented in generally perpendicular relationship with respect to said drive shaft housing;
   a lever arm bracket adjustably carried by said torque transfer housing of said drilling head and having a bracket base, a bracket channel provided in said bracket base and receiving said torque transfer housing and a pair of spaced-apart bracket arms extending from said bracket base;
   an arm actuation cylinder carried by said drill;
   an arm piston extendable from said arm actuation cylinder;
   a lever arm pivotally carried by said arm piston and said torque transfer housing of said drilling head;

a bracket-engaging arm extending from said lever arm at an obtuse angle with respect to said lever arm;
a piston extension stem valve and a piston retraction stem valve connected between said drill and said arm actuation cylinder;
a piston extension button engaging said piston extension stem valve and a piston retraction button engaging said piston retraction stem valve; and
a control box carried by said drill and wherein said piston extension button and said piston retraction button are carried by said control box.

15. The attachment of claim 14 further comprising a cylinder attachment bracket carried by said drill and wherein said arm actuation cylinder is carried by said cylinder attachment bracket.

16. The attachment of claim 15 wherein said cylinder attachment bracket comprises a bracket collar receiving said drill and a pair of spaced-apart bracket flanges extending from said bracket collar and receiving said arm actuation cylinder.

* * * * *